US012662205B2

(12) United States Patent
Van Cappelle et al.

(10) Patent No.: US 12,662,205 B2
(45) Date of Patent: Jun. 23, 2026

(54) LIFTING SYSTEM FOR A SEMITRAILER OF AN ARTICULATED LORRY, LOGISTICS DEPOT FOR A LORRY FLEET, AS WELL AS A LOGISTICS SYSTEM

(71) Applicant: Daimler Truck AG,
Leinfelden-Echterdingen (DE)

(72) Inventors: Kristina Van Cappelle, Stuttgart (DE);
Wolfgang Kob, Waiblingen (DE);
Ulrich Voegele, Denkendorf (DE); Ralf Oberfell, Asperg (DE); Sebastian Beckmann, Stuttgart (DE); Fridtjof Stein, Ostfildern (DE); Tobias Schwalb, Bietigheim-Bissingen (DE)

(73) Assignee: Daimler Truck AG,
Leinfelden-Echterdingen (DE)

( * ) Notice: Subject to any disclaimer, the term of this patent is extended or adjusted under 35 U.S.C. 154(b) by 708 days.

(21) Appl. No.: 18/005,268

(22) PCT Filed: Jun. 16, 2021

(86) PCT No.: PCT/EP2021/066220
§ 371 (c)(1),
(2) Date: Jan. 12, 2023

(87) PCT Pub. No.: WO2022/012835
PCT Pub. Date: Jan. 20, 2022

(65) Prior Publication Data
US 2023/0264764 A1 Aug. 24, 2023

(30) Foreign Application Priority Data
Jul. 13, 2020 (DE) ..................... 10 2020 004 193.0

(51) Int. Cl.
*B62D 53/08* (2006.01)
*B66B 9/00* (2006.01)

(52) U.S. Cl.
CPC ............ *B62D 53/0857* (2013.01); *B66B 9/00* (2013.01)

(58) Field of Classification Search
CPC .............................. B62D 53/0857; B66B 9/00
See application file for complete search history.

(56) References Cited

U.S. PATENT DOCUMENTS

| 3,393,772 A | * | 7/1968 | Pelouch | ................... B66F 7/18 |
| | | | | 187/219 |
| 4,004,311 A | * | 1/1977 | Nola | ........................ B66F 7/16 |
| | | | | 14/71.7 |

(Continued)

FOREIGN PATENT DOCUMENTS

| DE | 10 2006 061 412 A1 | 6/2008 |
| DE | 10 2018 132 906 B3 | 6/2020 |

(Continued)

OTHER PUBLICATIONS

PCT/EP2021/066220, International Search Report dated Sep. 6, 2021 (Two (2) pages).

(Continued)

*Primary Examiner* — Michael A Riegelman
(74) *Attorney, Agent, or Firm* — Crowell & Moring LLP

(57) ABSTRACT

A lifting system for a semitrailer of an articulated lorry includes a lifting device where the semitrailer is adjustable by the lifting device in relation to a surface of a base element on which the semitrailer is positioned between a coupling position, in which a coupling element of the semitrailer is arranged at a coupling height above the surface of the base element, and a decoupling position, in which the coupling element is arranged at a decoupling height above the surface of the base element. The lifting device is associated with a surface segment of the base element where the surface segment is height-adjustable by the lifting device such that (Continued)

the semitrailer is adjustable between the coupling position and the decoupling position by an adjustment of the surface segment.

9 Claims, 7 Drawing Sheets

(56)                    References Cited

U.S. PATENT DOCUMENTS

| | | | | |
|---|---|---|---|---|
| 4,674,938 | A * | 6/1987 | Van Stokes | B66F 7/04 |
| | | | | 187/253 |
| 7,770,695 | B2 * | 8/2010 | Myers | E04H 6/06 |
| | | | | 187/211 |
| 11,820,613 | B2 * | 11/2023 | Valentin | B65G 69/005 |
| 2008/0116012 | A1 * | 5/2008 | Ferguson | B66F 7/02 |
| | | | | 187/213 |
| 2013/0240300 | A1 * | 9/2013 | Fagan | B66F 3/46 |
| | | | | 187/203 |
| 2014/0015223 | A1 * | 1/2014 | Banwart | B62D 53/0821 |
| | | | | 280/476.1 |
| 2019/0322474 | A1 * | 10/2019 | Linde | B65G 63/00 |
| 2023/0264764 | A1 * | 8/2023 | Van Cappelle | B62D 53/0857 |
| | | | | 187/401 |
| 2024/0025495 | A1 * | 1/2024 | Kimener | B62D 53/12 |

FOREIGN PATENT DOCUMENTS

| | | | | | |
|---|---|---|---|---|---|
| EP | | 2902299 | A1 * | 8/2015 | B66F 7/243 |
| GB | | 2416532 | B * | 10/2007 | B61D 47/005 |
| JP | | 11-100195 | A | 4/1999 | |
| WO | WO-2014202812 | A2 * | 12/2014 | | B61D 47/005 |
| WO | WO 2020/025201 | A1 | 2/2020 | | |

OTHER PUBLICATIONS

German-language German Office Action issued in German application No. 10 2020 004 193.0 dated Jun. 3, 2022 (Five (5) pages).
Chinese-language Chinese Office Action issued in Chinese Application No. 202180060766.7 dated Jun. 8, 2024, with partial English translation (11 pages).

* cited by examiner

LIFTING SYSTEM FOR A SEMITRAILER OF AN ARTICULATED LORRY, LOGISTICS DEPOT FOR A LORRY FLEET, AS WELL AS A LOGISTICS SYSTEM

BACKGROUND AND SUMMARY OF THE INVENTION

The invention relates to a lifting system for a semitrailer of an articulated lorry. Furthermore, the invention relates to a logistics depot for a lorry fleet. Moreover, the invention relates to a logistics system with a lorry fleet and with a logistics depot.

In the area of goods or freight transport, there are presently far-reaching efforts to increasingly automate logistics vehicles or transportation vehicles, wherein the overall aim consists of, if possible, completely automating the freight or goods flow from the manufacturer to the consumer or customer. The result is that in the future, more and more autonomous lorries will be part of the road traffic.

The respective lorries can, for example, be formed as an articulated train, which is formed from a towing vehicle with a loading platform and a trailer vehicle with a further loading platform. The towing vehicle and the trailer vehicle of the articulated train can be coupled to each other or are coupled to each other by means of a coupling device, for example a towbar. Alternatively to this, the respective lorry can be formed as an articulated lorry, which is formed from an articulated-lorry cab and a semitrailer. Here, the articulated-lorry cab does not have a loading platform, whereas the trailer vehicle is then formed as the semitrailer. The articulated-lorry cab and the semitrailer are connected or can be connected with each other by means of a fifth-wheel coupling. If the articulated-lorry cab is in road traffic by itself, i.e., without a semitrailer, then the articulated-lorry cab is a motor vehicle, more precisely a self-driving machine.

In order to decouple the articulated lorry from the individual vehicles—i.e., from the articulated-lorry cab and from the semitrailer—it is necessary to support the semitrailer on a base on which the articulated-lorry cab and the semitrailer are positioned in such a way that an end of the semitrailer that is facing or can be turned towards the articulated-lorry cab does not overturn onto the base as soon as the articulated-lorry cab has driven out from under the semitrailer. As the end of the semitrailer facing the articulated-lorry cab lies on a fifth-wheel plate of the articulated-lorry cab in the coupled-together state, the semitrailer of the articulated lorry is thereby positioned on the base by means of a wheel group of the semitrailer and by means of a wheel group of the articulated-lorry cab. In order to thus support the semitrailer on the base in the uncoupled state, roughly so that a loading surface of the semitrailer runs at least substantially parallel to the base, the respective semitrailer typically has a support assembly that is adjustable into a supporting position for decoupling the articulated-lorry cab. When adjusting the support assembly into the supporting position, the articulated-lorry cab is at least partially freed from the semitrailer, so that after opening the fifth-wheel coupling, the articulated-lorry cab can drive out from under the semitrailer, wherein the semitrailer—supported by the support assembly and its wheel group—is positioned stably in position on the base.

Regarding the constantly advancing automation of goods or freight transport, it is therefore necessary to automate the adjustment of the support assembly of semitrailers that are part of the goods or freight transport to be automated as far as possible.

To this end, DE 10 2006 061 412 A1 discloses, for example, a trailer that stands on supports at the front, which are in particular automatically extendable. For an automated coupling process, it is provided for this conventional trailer that the supports automatically retract. Since trailer vehicles designed according to this conventional trailer always carry the support assembly inside the vehicle, these conventional trailer vehicles are designed so as to be particularly mass-intensive due to this conventional support assembly. This, however, conflicts with an especially advantageous fuel or energy efficiency as well as low-emission status, in particular regarding articulated-lorry cabs and/or semitrailers that can be driven or moved at least partially electrically. This results in frequent or especially long stationary periods, in order to refuel the articulated-lorry cab or the semitrailer or to supply them with electrical drive energy, since a mass of the articulated-lorry cab or a mass of the semitrailer is especially high due to the conventional support assembly, which leads to an increased energy usage for propelling the articulated-lorry cab or the semitrailer. Such stationary periods are, however, undesirable, since they conflict with an especially high flow rate of goods or freight.

It is the object of the present invention to enable an especially efficient and in particular automated or automatable flow of goods or freight.

Features, advantages and advantageous embodiments of the lifting system according to the invention are to be considered as features, advantages and advantageous embodiments of the logistics operating facility according to the invention or of the logistics system according to the invention, and vice versa. Features, advantages and advantageous embodiments of the logistics operating facility according to the invention are to be seen as features, advantages and advantageous embodiments of the logistics system according to the invention, and vice versa. Advantageous embodiments having expedient developments of the invention are specified in the remaining claims.

A lifting system for a semitrailer of an articulated lorry is provided according to the invention. The articulated lorry has an articulated-lorry cab and the semitrailer, wherein the articulated lorry is designed so that the semitrailer and the articulated-lorry cab are coupled to each other. Here, the articulated-lorry cab has a drive mechanism of the articulated lorry, which means that the semitrailer is drivable or moveable by means of the drive mechanism of the articulated-lorry cab. It can be provided that the semitrailer has a further drive mechanism, by means of which the semitrailer can be individually manoeuvred in a limited range and/or a driving operation of the articulated lorry can be supported by means of the drive mechanism of the articulated-lorry cab. This means that the drive mechanism of the articulated-lorry cab is a main drive mechanism of the articulated lorry, wherein the drive mechanism of the semitrailer—if existent—is an auxiliary drive mechanism.

If the semitrailer is in use as intended, this is positioned over a wheel group, in particular a rear-side wheel group, on a surface of a base element. This base element can, for example, be a road surface, so that the surface of the base element is illustrated by the road surface. The semitrailer is therefore positioned on the surface of the base element at the rear, i.e., at an end facing away from the articulated-lorry cab, and rolls onto the surface of the base element by means of the rear-side wheel group during the driving operation of the articulated lorry or of the semitrailer. If the semitrailer and the articulated-lorry cab together form the articulated lorry, i.e., if the articulated-lorry cab and the semitrailer are coupled to each other, then the semitrailer is positioned on the surface of the base element by means of a wheel group, in particular a rear-side wheel group, of the articulated-lorry cab. The semitrailer is therefore positioned on the surface of the base element at an end facing the articulated-lorry cab by means of the articulated-lorry cab, as an end of the semitrailer facing the articulated-lorry cab is supported on the articulated-lorry cab, in particular on a fifth-wheel plate of the articulated-lorry cab.

In order to decouple the semitrailer and the articulated-lorry cab from each other, the semitrailer must consequently be supported or jacked up separately from the articulated-lorry cab on the surface of the base element at least at the end on which the semitrailer is supported on the articulated-lorry cab, so that a fifth-wheel coupling can be released between the articulated-lorry cab and the semitrailer, whereby the articulated-lorry cab can drive out from under the semitrailer without this overturning onto the surface of the base element in a disadvantageous manner. To this end, a lifting device is provided in the lifting system, by means of which the semitrailer is adjustable between a coupling position and a decoupling position, in relation to the surface of the base element. If the semitrailer is arranged in the coupling position, then a coupling element of the semitrailer, for example a coupling pin (which can also be called a kingpin or king pin) is arranged at a height level that corresponds to a height level of a coupling element of the articulated-lorry cab that corresponds to the coupling element of the semitrailer, for example of a coupling pin receiver. This means that the semitrailer is then arranged at least in the coupling position if the semitrailer and the articulated-lorry cab are coupled to each other by means of the fifth-wheel coupling. In other words, the coupling element of the semitrailer is arranged at a coupling height above the surface of the base element in the coupling position. If the semitrailer is adjusted into the decoupling position, then the coupling element or the kingpin or king pin is arranged at a different height level, which is higher in relation to the surface of the base element than the previously mentioned height level of the coupling position. This means that the semitrailer is raised, at least at the end facing the articulated-lorry cab, in the decoupling position compared to the coupling position.

Since the height level at which the coupling element of the semitrailer is arranged in the decoupling position is higher than the height level of the coupling position, the articulated-lorry cab is at least freed from the semitrailer in this respect, since the articulated-lorry cab can drive away from the semitrailer after an opening of the fifth-wheel coupling, without pulling the semitrailer in an undesired manner. Therefore, the decoupling position is additionally provided to divide the articulated lorry into the two individual vehicles of the articulated lorry, namely into the articulated-lorry cab and the semitrailer. Furthermore, the decoupling position is provided to enable a coupling of the two individual vehicles to each other, since the decoupling position of the semitrailer enables the articulated-lorry cab to drive under the semitrailer, without hitting or pushing this. Therefore, if the articulated-lorry cab has driven under the semitrailer while the semitrailer is adjusted in the decoupling position and if the coupling element of the semitrailer and the coupling element receiver of the articulated-lorry cab are at least roughly aligned with each other, then the semitrailer and the articulated-lorry cab are coupled to the articulated lorry during an adjustment of the semitrailer from the decoupling position into the coupling position. Therefore, the coupling element or the kingpin or king pin of the semitrailer is thus arranged at a decoupling height above the surface of the base element in the decoupling position, so that manoeuvring the articulated-lorry cab under the semitrailer is enabled, for example to couple and/or decouple the articulated lorry.

In order to enable an especially efficient and in particular automated goods or freight flow, it is provided according to the invention that the lifting device of the lifting system is formed at least partially, in particular mostly, externally to the articulated lorry. More precisely, it is provided according to the invention that at least one surface segment of the base element is associated with the lifting device and is designed to be height-adjustable by means of this. This means that the whole surface of the base element is formed by means of the surface segment that is associated with or assigned to the lifting device and at least one surface segment that is associated only with the base element and that is independent of the lifting device. This surface segment that is purely associated with the base element and that is independent of the lifting device is in particular arranged so as to be immovable. To this end, the surface segment that is associated with the lifting device is formed height-adjustably in relation to the surface segments that are associated with the base element or to the surface segment that is associated with the base element. To this end, the semitrailer is adjustable between the coupling position and the decoupling position by means of an adjustment of the surface segment of the lifting device. Because the surface segment associated with the lifting device is adjustable in its height or in its height level by means of the lifting device, the semitrailer can be adjusted between the decoupling position and the coupling position by means of the lifting device and by means of the corresponding surface segment.

For example, the lifting device has an actuator unit that has at least one actuator, so that, because the actuator unit is correspondingly adjustable, the semitrailer is pivotable between the coupling position and the decoupling position. This is because the rear-side wheel group of the semitrailer remains positioned on the surface of the base element in both the coupling position and also in the decoupling position. The wheel group of the semitrailer is mounted on a frame of the semitrailer so it can pivot around a vehicle transverse axis of the semitrailer, in order to compensate for rises/drops and/or height levels of different fifth-wheel plates. The actuator unit is preferably motor-operable, so that a user of the lifting system can trigger or operate an adjustment of the actuator unit and as a result of the semitrailer, for example by means of an electrical or electronic control element (for example a switch or a button etc.). The actuator unit has, to this end, at least one fluid-mechanically operable actuator and/or an actuator operable without fluid, in particular a linear actuator. This means the actuator unit has the at least one hydraulic actuator (hydraulic actuator, which can also be referred to as a "hydraulic cylinder"), at least one pneumatic actuator (pneumatic actuator, which can also be referred to as a "pneumatic cylinder") and/or at least one electro-mechanical actuator (for example a rack and pinion gear, a cable pull or a linear actuator of another nature). Hybrid forms of the mentioned actuator principles are furthermore conceivable.

Because at least the lifting device of the lifting system is formed externally of the articulated lorry, in particular externally to the semitrailer, the articulated lorry has an especially low total mass, since the semitrailer is separate from the lifting device of the lifting system. In this way, the semitrailer and consequently the articulated lorry is operable especially fuel- or energy-efficiently and/or in a low-emission manner. In particular, if the articulated-lorry cab and/or the semitrailer are/is designed to be at least partially electrically operable or moveable, then this leads, in an advantageous manner, to an especially high range of the articulated lorry for a given capacity of an electrical energy storage device of the articulated lorry, for example of a traction battery. Meanwhile, especially short stationary periods for refuelling and/or for electrical charging of the articulated lorry result from this, whereby an especially high flow rate of goods or freight is ensured. In this regard, the lifting system is thus a suitable means to enable an especially efficient and in particular automated or automatable flow of goods or freight. Furthermore, it is an advantage of the lifting system that it is compatible with conventional semitrailers, independent of whether the semitrailer is equipped with a conventional support assembly or not.

In further embodiments of the lifting system, this has a position sensor system, by means of which a current position of a support assembly of the semitrailer can be detected in relation to the lifting device, wherein the adjustment of the lifting device is releasable and/or lockable by means of the lifting system, based on the current position of the support assembly in relation to the lifting device. It is thus, for example, provided that, in the lifting system the lifting device is only then released if an actual position of the support assembly of the semitrailer corresponds with a predetermined or predeterminable target position of the support assembly. This target position is thereby in particular characterized in that a risk-free or safe adjustment of the semitrailer between the coupling position and the decoupling position is ensured. Therefore, it can further be provided that the adjustment of the semitrailer by means of the lifting device is blocked by the lifting system, as soon as the actual position of the support assembly of the semitrailer and the target position of the support assembly coincide.

To this end, the position sensor system has in particular at least one position sensor, by means of which the actual or current position of the support assembly in relation to the lifting device can be detected, sensed or found. In particular, this position sensor is a radar sensor and/or a camera sensor. Alternatively or additionally, it is conceivable that the position sensor functions according to a different sensor principle (for example inductively, magnetically, capacitively and/or generally opto-electronically, etc.).

By means of the position sensor system, an especially safe adjustment of the semitrailer between the decoupling position and the coupling position is enabled, since an adjustment of the lifting device is blocked by means of the lifting system, for example by means of a control unit, if the semitrailer or its support assembly is not correctly positioned in relation to the lifting device. Therefore, the risk of an accident when adjusting the semitrailer between the decoupling position and the coupling position is, in an advantageous manner, especially low, whereby occupational safety for a human worker on the lifting system and/or on the semitrailer is especially high.

In connection with the position sensor system, it has furthermore proven to be advantageous if the position sensor system can be arranged or is arranged at least partially on/in the articulated-lorry cab of the articulated lorry. For example, the position sensor system comprises at least the (previously mentioned first) position sensor on the articulated-lorry cab. This means that the lifting system is formed at least partially on the articulated lorry, in particular on the articulated-lorry cab. In other words, the lifting system has, in this case, at least one component that is formed remotely to the lifting device. It is especially preferred if the first position sensor is formed on the articulated-lorry cab as a "rear-view" sensor. In other words, the first position sensor is arranged on an end of the articulated-lorry cab facing the semitrailer, i.e., on a rear of the articulated-lorry cab, and, for example, aligned on the surface of the base element on which the articulated lorry is positioned or onto which the articulated lorry drives. This sensor of the position sensor system formed on the articulated-lorry cab and/or the surface segment associated with the lifting device are/is formed in such a way that, by means of the sensor on the articulated-lorry cab, it is detected or recognised if the articulated-lorry cab has driven away across the surface segment associated with the lifting device. If a control unit of the position sensor system, for example the control unit of the lifting system, is now provided with a distance, that runs parallel to the surface, between the sensor of the articulated-lorry cab and the control unit of the semitrailer, then it can be calculated—for example by means of the control unit—how far the articulated lorry still has to drive after the articulated-lorry cab has passed the lifting device, so that the actual position of the support assembly of the semitrailer and the target position of the support assembly of the semitrailer in relation to the lifting device coincide.

Because the position sensor system is formed or arranged at least partially on the articulated-lorry cab, the lifting system can be used especially flexibly or versatilely and, in particular, adapted to a plurality of articulated-lorry cabs that are formed differently to each other. Furthermore, the lifting system is then adaptable to a plurality of articulated-lorry cabs that are formed differently. This means that the lifting system is operable with a plurality of articulated lorry combinations as intended, wherein work for conversion or upgrade is limited, in an advantageous way, to equipping the articulated-lorry cab with the (first) position sensor.

The control unit of the lifting system is in particular formed at least partially on/in the articulated-lorry cab. To this end, the control unit of the lifting system comprises, for example, a computing unit that can be coupled or is coupled to the position sensor system, in particular to the first position sensor, which is formed or arranged on/in the articulated-lorry cab in an advantageous manner. It can furthermore be provided that the control unit of the lifting system has a further (second) computing unit, which is configured to control the lifting device, wherein both computing units are then coupled or can then be coupled with each other, in particular wirelessly. To this end, the computing units each have a data transceiver, wherein these data transceivers correspond with each other, so that the first computing unit arranged on/in the articulated-lorry cab and the second computing unit arranged externally to the articulated-lorry cab can be brought into data communication with each other, at least in order to adjust the semitrailer between the decoupling position and the coupling position.

Alternatively or additionally to the position sensor system that is arranged at least partially on/in the articulated-lorry cab, it can be provided in further embodiments of the lifting system that the position sensor system is arranged at least partially on/in the lifting device. For example, the position sensor system then comprises at least one further (for example second) position sensor on the lifting device. By means of the second position sensor, the support assembly of the semitrailer can be detected, at least then, if the articulated lorry is positioned in relation to the lifting device in such a way that the support assembly of the semitrailer has assumed the target position in which a safe adjustment or pivoting of the semitrailer between the decoupling position and the coupling position is enabled, as intended. For example, the second position sensor can provide a corresponding sensor signal as soon as the support assembly is arranged in the target position. Furthermore, it can be provided that the second position sensor then already detects the support assembly of the semitrailer if the actual position of the support assembly and the target position still do not coincide. It is then, for example, conceivable, that the second position sensor provides a corresponding sensor signal, which characterizes the travel path of the articulated lorry still to be travelled, in order to bring the support assembly of the semitrailer into the target position for adjusting the semitrailer.

If both the first position sensor and the second position sensor are used in the lifting system, then an especially exact positioning of the semitrailer in relation to the lifting device is enabled. Furthermore, thanks to the two position sensors, a plausibility check can be carried out as to whether the support assembly of the semitrailer is actually arranged in the target position, for example by means of the control unit of the lifting system. If one of the two position sensors thus malfunctions and incorrectly outputs a sensor signal that the support assembly of the semitrailer is already arranged in the target position, although this is still not at all the case, then this can be checked or verified by means of the sensor signal of the corresponding other one of the position sensors. In this case, it can be provided that an error signal is provided by means of the control unit, in order to signal that the actual position of the support assembly of the semitrailer must be verified, for example by service personnel.

If only the second position sensor—so the position sensor arranged on the lifting device—is used in the lifting system, then this offers the advantage that absolutely no conversion measures of the articulated lorry need to be taken in order to operate the lifting system together with the articulated lorry as intended.

According to a further embodiment of the lifting system, this has a further (second) lifting device that is designed differently to the first lifting device, by means of which the base element together with the first lifting device is height-adjustable between a first road surface level and at least one further road surface level. The lifting system is therefore multifunctional. On the one hand, the lifting system is configured to support a decoupling of the articulated-lorry cab and its semitrailer as well as a coupling of the articulated-lorry cab and its semitrailer to each other in an especially efficient manner, by means of the first lifting device. Due to the second lifting device, the lifting system is, on the other hand, designed to transport at least the semitrailer between the first road surface level and the at least one further road surface level, in particular in the perpendicular direction or along a parallel to a vehicle vertical axis of the semitrailer. This means that the second lifting device forms a lift system for the semitrailer.

This is advantageous in that the lifting system is formed especially spatially efficiently, and, in an especially small space or on an especially small surface, enables both a coupling together and a decoupling from each other of the articulated lorry as well as moving the semitrailer onto a different road surface level. Thoughts about an especially efficient utilisation of surfaces and/or space, in particular in in-built up areas, are hereby particularly taken into account. This is because it is, for example, made possible to decouple the articulated-lorry cab and the semitrailer from each other on the first road surface level, for example on a ground floor, then to lift the semitrailer onto the second road surface level, e.g., a first upper floor, by means of the second lifting device, in order to unload or load the semitrailer there.

According to a further embodiment of the lifting system, the lifting system has a unit for providing signals, by means of which a status signal characterizing a current status of the lifting system can be provided to the articulated-lorry cab of the articulated lorry. The current status of the lifting system about which the unit for providing signals provides a corresponding status signal includes, for example, a current operating mode of the lifting system, a sensor event of the lifting system, in particular of the position sensor system, an operating mode of the first lifting device, an operating mode of the second lifting device etc. A corresponding status signal can thereby be provided, for example by means of the unit for providing signals, stating that the support assembly of the semitrailer has occupied or is occupying the target position in relation to the first lifting device. Furthermore, the unit for providing signals provides a status signal stating that the first lifting device is currently being moved towards the coupling position and/or towards the decoupling position. Furthermore, a status signal can state or describe that the first lifting device is currently arranged in the decoupling position and/or is currently arranged in the decoupling position.

The status signal produced and/or provided by means of the unit for providing signals is in particular directed at a (human) driver of the articulated-lorry cab. To this end, it can be provided that the unit for providing signals provides the status signal in an optical manner and, to this end, has, for example, a traffic light signal system ("traffic light"). It can furthermore be provided that the unit for providing signals provides the status signal in an acoustic manner and, to this end, has equipment for outputting acoustic signals, e.g., a loudspeaker. It is alternatively or additionally conceivable that the unit for providing signals provides the status signal to the driver of the articulated-lorry cab in a in a haptic manner. To this end it can, for example, be provided that the unit for providing signals comprises a vibrating element that is formed on/in the articulated-lorry cab. This is preferably arranged in the articulated-lorry cab in such a way that the vibrating element affects a driver's cockpit of the articulated-lorry cab, for example on a steering wheel, on a driver's seat, etc.

The status signal can also be a purely electrical and/or purely electronic signal, which is provided directly to a steering and drive mechanism of the articulated-lorry cab, wherein the steering and drive mechanism of the articulated-lorry cab then in particular accepts the status signal as a control signal or control input signal. In this context, it is then especially advantageous if the steering and drive mechanism of the articulated-lorry cab provides at least one at least partially autonomous or partially automatic driving operating mode, in which the articulated-lorry cab can be driven at least partially autonomously or at least partially automatically by means of the steering and drive mechanism. In this way—and in particular in conjunction with the position sensor system—the articulated lorry can then be aligned at least partially automatically and/or at least partially autonomously in relation to the first lifting device and/or in relation to the second lifting device by means of the steering and drive mechanism of the articulated-lorry cab in connection with the unit for providing signals in such a way that a respective adjustment of the first lifting device and/or of the second lifting device is enabled as intended.

The lifting system equipped with the unit for providing signals offers the advantage that the human driver of the articulated-lorry cab or of the articulated lorry is always being provided with information about the current operating mode and/or about the current status of the lifting system. Therefore, the human driver can then operate the articulated-lorry cab and/or the articulated lorry appropriately. If the unit for providing signals provides the status signal as the control signal for the steering and drive mechanism of the articulated-lorry cab, then an especially efficient procedure in manoeuvring the articulated-lorry cab and/or the articulated lorry in relation to the first lifting device and/or in relation to the second lifting device is thus ensured. Therefore, an—in particular sensor-guided—at least partially automatic or at least partially autonomous control of the articulated-lorry cab or of the articulated lorry is typically more accurate, faster and/or less error-prone than a control of the articulated-lorry cab or of the articulated lorry by a person.

Generally, a safety unit is in particular provided in the lifting system, by means of which the semitrailer rolling away is prevented, even if the semitrailer and the articulated-lorry cab are decoupled from each other. For example, this can herein concern a recess or hollow in the surface of the base element, which corresponds with the rear-side wheel group of the semitrailer in such a way that the rear wheel group is immersed in the hollow or recess, in particular if the support assembly of the semitrailer is arranged in the target position in relation to the first lifting device. In this way, the articulated lorry rolling away is prevented, so that the support assembly of the semitrailer remains arranged in the target position in relation to the first lifting device after the articulated lorry has stopped—e.g., if the driver releases the service brake.

The invention further relates to a logistics operating facility for a lorry fleet. The lorry fleet is made up of a plurality of lorries, wherein the respective lorries can be formed as an articulated train or as an articulated lorry. This means that the lorry fleet can have both at least one articulated train as well as at least one articulated lorry, in particular several of each.

In order to enable an especially efficient and in particular automated or automatable flow of goods or freight by means of the logistics operating facility, the logistics operating facility has a lifting system formed according to the above description.

The logistics operating facility, which can also be referred to as the "hub", has, for example, at least one building and is also configured to operatively support journeys of the lorry fleet. In particular if the lorries of the lorry fleet are at least partially equipped with a steering and drive mechanism, which provide a fully automated operating mode (according to Level 4 of SAE J3016), the logistics operating facility or the hub is configured to operatively support these Level 4 journeys. The correspondingly equipped lorries of the lorry fleet are therefore "self-driving lorries", the driving assignment of which advantageously both ends and/or begins at a logistics operating facility. Coordinating the self-driving lorries, their respective loads, towing vehicles, and trailer vehicles, and the maintenance and/or inspection thereof occurs at/in the logistics operating facility. To the end, the respective logistics operating facility has the necessary maintenance, inspection, weighing, cleaning, refuelling, routine repair, and/or calibration infrastructure that is necessary in order to ensure or maintain an especially efficient operation of the self-driving lorries. Furthermore, the respective logistics operating facility comprises a data processing infrastructure that supports the operation of the respective logistics operating facility.

In further embodiments of the logistics operating facility, this has at least two floors or storeys and the lifting system, which comprises the first lifting device and the second lifting device. As already described in relation to the lifting system, then preferably, the first road surface level is a first of the floors, for example a ground floor, and the at least one further road surface level is another of the floors, for example a first upper floor. It is therefore provided that, in the logistics operating facility with the lifting system, the base element, on which at least one part of the corresponding lorry is positioned, is adjusted between the first of the floors and at least one further one of the floors. If the corresponding lorry is an articulated train, it can, for example, be provided that only the trailer vehicle is height-adjustable between the floors by means of the lift or by means of the second lifting device. It can furthermore be provided that the second lifting device has enough space in order to transport or to move the entire lorry between the floors. It is especially preferred if the corresponding lorry is an articulated lorry, wherein then—as already outlined further above—the lift of the logistics operating facility is designed to transport or to adjust the semitrailer between the floors of the logistics operating facility.

A logistics operating facility designed in this way is especially spatially efficient or space efficient, so that the full functional potential of the corresponding logistics operating facility can be concentrated in an especially small area in an advantageous manner.

In relation to the logistics operating facility that has the first lifting device and the second lifting device, it is in particular provided that, on the first of the floors, the trailer vehicle and the towing vehicle of the corresponding lorry, i.e., for example the articulated-lorry cab and the semitrailer, can be decoupled or are decoupled from each other by means of the first lifting device, whereby the trailer vehicle, for example the semitrailer, is then adjustable onto the further one of the floors by means of the second lifting device, whereby a further towing vehicle designed differently to the first towing vehicle and the trailer vehicle are coupled onto each other on the further one of the floors. Herein, at least one of the towing vehicles is only associated with the logistics operating facility.

For example, the second or further towing vehicle is only associated with the logistics operating facility and is in particular not designed and/or equipped in order to legally take part in public road traffic. The further towing vehicle that is only associated with the logistics operating facility is in particular an autonomously operable transportation vehicle of the factory traffic of the logistics operating facility, in particular a driving robot. Such a towing vehicle, which is purely used in the factory traffic of the logistics operating facility, differs from the first towing vehicle, in particular from the articulated-lorry cab, for example in that there is no driver's cockpit provided for a human driver. Furthermore, the further towing vehicle is designed to be especially compact, whereby a manoeuvrability of the further towing vehicle is especially versatile, in an advantageous manner. On the further one of the floors, the semitrailer or the trailer vehicle can then thereby be especially efficiently—in particular space efficiently—manoeuvred by means of the further towing vehicle, so that on the further floor, the space available there can be utilised especially efficiently.

The invention finally relates to a logistics system that has a lorry fleet and at least one logistics operating facility according to the preceding description. Because the logistics operating facility and consequently the lifting system are used in the logistics system, the logistics system according to the invention enables an especially efficient and in particular automated or automatable flow of goods or freight.

Further advantages, features and details of the invention arise from the following description of a preferred exemplary embodiment, as well as with the aid of the drawings. The features and combinations of features specified above in the description and the features and combinations of features specified below in the description of the figures and/or in the figures only can be used not only in the combination specified in each case, but also in other combinations or on their own without exceeding the scope of the invention.

DETAILED DESCRIPTION OF THE DRAWINGS

Figures 1, 2:
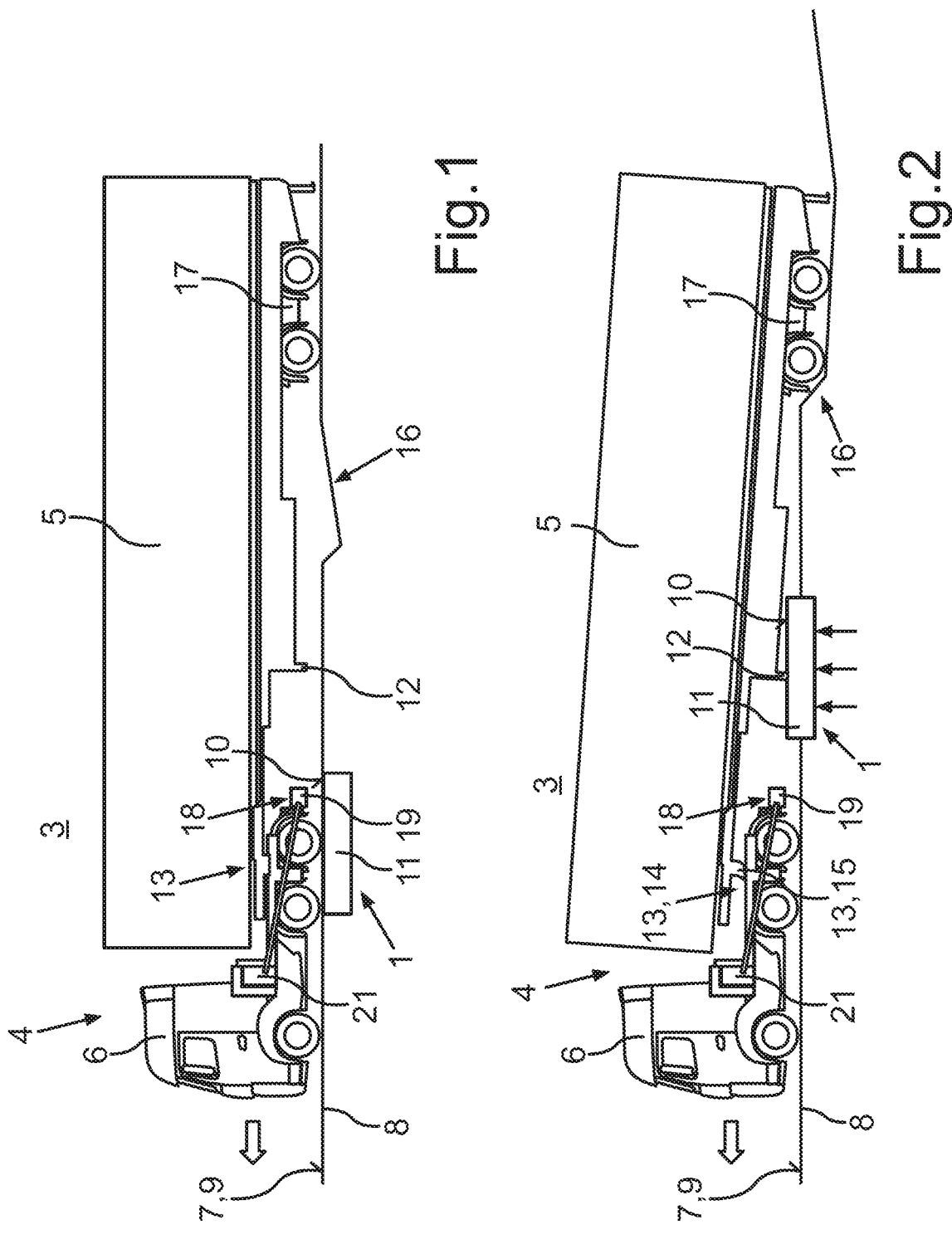
FIG. 1 is a schematic view of an articulated lorry driving onto a lifting system.
FIG. 2 is a schematic view of the articulated lorry, wherein its semitrailer is pivoted into a decoupling position by means of the lifting system.

In the figures, the same or functionally identical elements are provided with the same reference numerals.

In the following, a lifting system 1, a logistics operating facility 2 (shown for the first time in FIG. 7) as well as a logistics system 3 are described together.

Figures 3, 4:
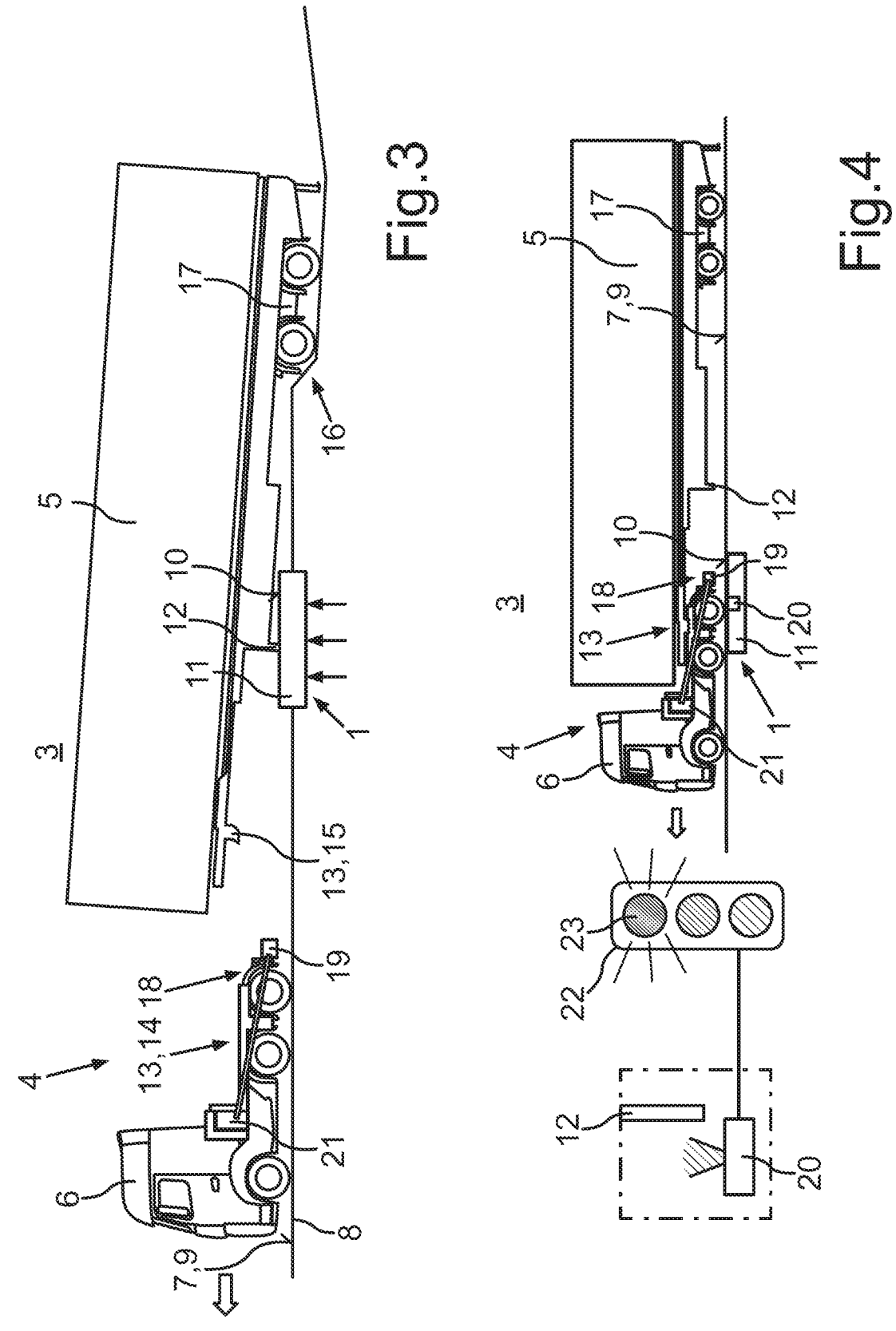
FIG. 3 is a schematic view of the articulated lorry, wherein its articulated-lorry cab drives out from under the semitrailer pivoted into the decoupling position.
FIG. 4 is a schematic view of the articulated lorry driving onto the lifting system, which provides a first status signal by means of a unit for providing signals.

FIG. 1 shows a schematic view of an articulated lorry 4 driving onto the lifting system 1. FIG. 2 shows a schematic view of the articulated lorry 4, wherein its semitrailer 5 is pivoted into a decoupling position by means of the lifting system 1. FIG. 3 shows a schematic view of the articulated lorry 4, wherein its articulated-lorry cab 6 is driving out from under the semitrailer 5 that is pivoted into the decoupling position. It can be recognised in FIG. 1 how the articulated lorry 4, which is formed from the semitrailer 5 and the articulated-lorry cab 6, drives in/on the logistics operating facility 2 as part of the logistics system 3, wherein the articulated lorry 4 drives on a surface 7 of a base element 8. Here, the surface 7 has at least two surface segments 9, 10, so that the (whole) surface 7 of the base element 8 is formed at least by the two surface segments 9, 10.

The lifting system 1 furthermore has a first lifting device 11, which is integrated, preferably embedded, into the base element 8. Here, the surface segment 10 is associated with the first lifting device 11, so that this surface segment 10 is height-adjustable in relation to the surface segment 9, by means of the first lifting device 11. In a completely lowered position of the first lifting device 11 (see FIG. 1), the surface segment 10 of the first lifting device 11 is therefore also completely lowered. In this state, the surface segments 9, 10 are at a common level, so that there is no height difference between the surface segments 9, 10. This means that the articulated lorry 4, in particular the articulated-lorry cab 6, can smoothly drive away over the lifting device 11, in particular over its surface segment 10, without having to overcome an edge or a height difference.

The semitrailer 5 is in particular a conventional semitrailer or one that is known from the prior art, and accordingly has a support assembly 12 that is configured to hold and support the semitrailer 5 jacked up off the base element 8, in particular off the surface 7, in order to enable a coupling and/or decoupling of the articulated-lorry cab 6. To this end it is, for example, known that the support assembly 12 has two extendable supports, so that the logistics system 2 is supported on the surface 7 of the base element 8 when these supports are extended, in order to unload the articulated-lorry cab 6 from the semitrailer 5, so that the articulated-lorry cab 6 can drive out from under the logistics system 2, without thereby pulling the semitrailer 5. Before the articulated-lorry cab 6 drives away from the semitrailer 5, a fifth-wheel coupling 13 between the semitrailer 5 and the articulated-lorry cab 6 must be detached.

As is known, the fifth-wheel coupling 13 has a coupling element 14 on the side of the articulated-lorry cab as well as a coupling element 15 on the side of the semitrailer, wherein the coupling elements 14, 15 correspond with each other. For example, the coupling element 14 on the side of the articulated-lorry cab can be a fifth-wheel plate, while the coupling element 15 on the side of the semitrailer can be a king pin or kingpin. Therefore, the fifth-wheel plate or the coupling element 14 on the side of the articulated-lorry cab has, for example, a king pin receiver, wherein the king pin or the coupling element 15 on the side of the semitrailer and the king pin receiver or the coupling element 14 on the side of the articulated-lorry cab engage in each other, so that the fifth-wheel coupling is closed in this state. If the articulated-lorry cab 6 and the semitrailer 5 are therefore coupled onto each other by means of the fifth-wheel coupling 13 and if the fifth-wheel coupling 13 is closed or latched and/or locked, then the semitrailer 5 can be pulled, pushed and/or steered by the articulated-lorry cab 6. In this respect, the articulated lorry 4 then forms a lorry, wherein it is provided in the present example that this lorry or the articulated lorry 4 is fully automatically operable, in particular movable, according to SAE J3016, Level 4. This means that the articulated lorry 4, in particular the articulated-lorry cab 6, has a steering and drive mechanism (not shown), which provides at least one fully automatic drive operation mode designed according to Level 4, at least for the articulated-lorry cab 6. This means that all driving tasks described herein that are connected with the lifting system 1, the logistics operating facility 2 and/or the logistics system 3 can be performed or carried out in the fully automatic drive operation mode. Alternatively or additionally, it can be provided that a (human) driver performs or carries out the driving tasks in a conventional manner by means of conventional control elements of the articulated-lorry cab 6.

For separating or decoupling the articulated lorry 4, so that the articulated-lorry cab 6 and the semitrailer 5 are separate from each other, the lifting system 1 is now primarily used, wherein it is provided that the support assembly 12—such as extendable supports of the same—remains unoperated.

To this end, the articulated lorry 4 is initially driven further over the surface 7 until an actual position of the support assembly 12 in relation to the first lifting device 11 corresponds to a predetermined or predeterminable target position, which is illustrated in FIG. 2. Starting with the state that is illustrated in FIG. 1, the articulated-lorry cab 6 thus pulls the semitrailer 5 further across the first lifting device 11, until the target position and the actual position of the support assembly 12 coincide. For example, the surface segment 10 associated with the first lifting device 11 is then lifted or extended by means of an actuator of the first lifting device 11. In other words, the surface segment 10 associated with the first lifting device 11 is lifted or moved out of the (imaginary) plane of the surface 7, so that the surface segment 10 and the support assembly 12 come into direct mechanical contact. The surface segment 10 is then lifted further, so that ultimately the articulated-lorry cab 6 is unloaded from the semitrailer 5. During a further lifting of the surface segment 10 and/or during a further driving of the articulated-lorry cab 6 alone, the coupling elements 14, 15 move out of each other, so that then a mechanical connection between the articulated-lorry cab 6 and the semitrailer 5 is detached as intended. This eventually results in the state illustrated in FIG. 3, wherein the articulated-lorry cab 6 drives alone, in particular away from the semitrailer 5, in the logistics operating facility 2 or in the logistics system 3 it is for example provided that the articulated-lorry cab 6 then drives to a service device of the logistics operating facility 2 or of the logistics system 3, in order to, for example, be refuelled and/or electrically (re)charged.

In FIGS. 1, 2 and 3, a braking element 16 is furthermore illustrated, that is herein formed as a recess, that corresponds to the rear-mounted wheel group 17 of the semitrailer 5. When the articulated lorry 4 drives over the first lifting device 11, the wheel group 17 dips into the braking element 16 or into the recess so that then, at least if the support assembly 12 is aligned in the target position, an undesired rolling of the semitrailer 5 is avoided.

The lifting system 1, in particular the first lifting system 11, is thus formed to adjust, in particular to pivot, the semitrailer 5 between a coupling position (see FIG. 1) and a decoupling position (see FIG. 2, FIG. 3). The coupling position is hereby characterized in that the coupling element 15 on the side of the semitrailer—so the king pin—is arranged at the coupling height. In contrast, the decoupling position is characterized in that the coupling element 15 on the side of the semitrailer or the king pin is arranged at the decoupling height, wherein the decoupling height and the coupling height are each to be measured between the king pin or the coupling element 15 on the side of the semitrailer and the surface segment 9.

It is provided that the semitrailer 5 is then only arranged in the coupling position if the king pin or the coupling element 15 on the side of the semitrailer engages in its corresponding coupling element receiver or king pin receiver of the articulated-lorry cab 6. For decoupling the articulated-lorry cab 6 from the semitrailer 5 and/or when decoupling the articulated-lorry cab 6 from the semitrailer 5, it is provided that the semitrailer 5 is adjusted out of the coupling position into the decoupling position by means of the first lifting device 11. It is therefore provided that the semitrailer 5 is arranged in the decoupling position if the semitrailer 5 and the articulated-lorry cab 6 are decoupled from each other, i.e., each form an individual vehicle.

The lifting system 1 further has a position sensor system 18, that comprises a first position sensor 19 as well as a second position sensor 20 in the present example (see FIG. 4). Here, the first position sensor 19 is formed or arranged on the articulated-lorry cab 6, in particular on a rear of the articulated-lorry cab 6. This means that the position sensor system 18 is at least partially formed on the articulated-lorry cab 6. Here, the second position sensor 20 is formed on/in the first lifting device 11 (see FIG. 4). It is therefore provided that the position sensor system 18 is arranged at least partially on the first lifting device 11, for example is integrated into this.

A current position of the support assembly 12, i.e., the actual position of the support assembly 12, is detected in relation to the first lifting device 11 by means of the position sensor system 18, i.e., by means of the first position sensor 19 and/or by means of the second position sensor 20. The adjustment of the first lifting device 11 based on the actual position of the support assembly 12 in relation to the first lifting device 11 is then released and/or locked by means of the lifting system 1. To this end, the position sensors 19, 20, so the position sensor system 18, are in data connection with a control unit 21 for transmitting sensor data, wherein the control unit 21 can be a control unit of the lifting system 1, of the logistics operating facility 2 and/or of the logistics system 3. Herein, the control unit 21 is at least partially formed in/on the articulated-lorry cab 6. For example, a relative position between the first lifting device and the support assembly 12 can be detected by means of the first position sensor 19 when driving over the first lifting device 11, in that it is detected by means of the first position sensor 19 the distance by which the articulated-lorry cab 6 has passed the first lifting device 11. While a distance between the first position sensor 19 and the support assembly 12 of the control unit 21 is further provided, a path to be travelled by the articulated lorry 4 is also calculated, until the target position and the actual position of the support assembly coincide. The support assembly 12 is therefore especially efficiently manoeuvrable into the target position, with the help of the position sensor system 18, in particular with the help of the first position sensor 19. A possible mode of operation of the second position sensor 20 is discussed in still more detail in the following.

Figures 5, 6:
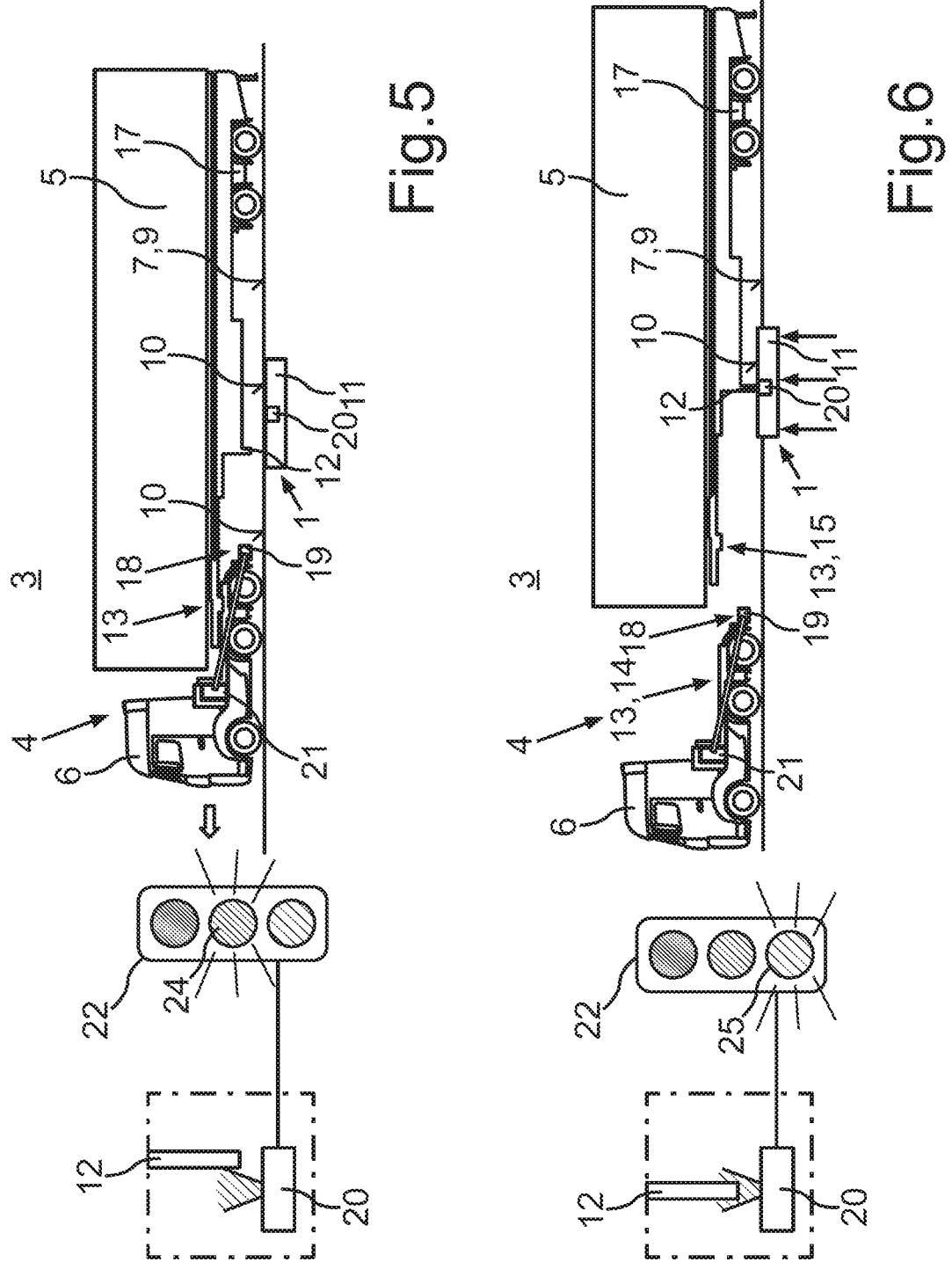
FIG. 5 is a schematic view of the articulated lorry driving onto the lifting system, which provides a second status signal by means of the unit for providing signals.
FIG. 6 is a schematic view of the articulated lorry, wherein the semitrailer is adjusted into the decoupling position by means of the lifting system, which provides a third status signal by means of the unit for providing signals.

FIG. 4 shows a schematic view of the articulated lorry 4 driving onto the lifting system 1, which is equipped with a unit for providing signals 22, by means of which a first status signal 23 can be provided. FIG. 5 shows a schematic view of the articulated lorry 4 driving onto the lifting system 1, wherein a second status signal 24 is provided by means of the unit for providing signals 22. Further, FIG. 6 shows a schematic view of the articulated lorry 4, wherein the semitrailer 5 is adjusted into the decoupling position by means of the lifting system 1 and wherein a third status signal 25 is provided by means of the unit for providing signals 22. The position of the articulated lorry 4 in relation to the first lifting device 11 illustrated in FIG. 4 corresponds to the position of the articulated lorry 4 in relation to the first lifting device 11 illustrated in FIG. 1. Firstly, the second position sensor 20 of the position sensor system 18 is illustrated in FIG. 4, wherein it must be recognised that the second position sensor 20 is integrated into the first lifting device 11 herein. Furthermore, the unit for providing signals 22 is illustrated in FIG. 4, by means of which the first status signal 23 can be output or is output. The unit for providing signals 22, which herein is formed as a traffic light signal system or traffic light, shows the first status signal 23 in FIG. 4, which is activated—for example by means of the control unit 21—if the actual position and the target position of the support assembly 12 do not coincide and the articulated lorry 4 therefore must drive further across the first lifting device 11, until the target position and the actual position of the support assembly 12 coincide. Furthermore, the first status signal 23 can be provided or output by means of the traffic light signal system or by means of the unit for providing signals 22, if the support assembly 12 is (still) not detected by means of the second position sensor 20 or if it is detected by means of the second position sensor 20 that the target position and the actual position of the support assembly 12 no longer coincide.

In order to control the unit for providing signals 22 in such a way that this displays a different status signal to the first status signal 23, the unit for providing signals 22 and the position sensor system 18, in particular the second position sensor 20, are coupled or can be coupled with each other by means of data technology, at least indirectly. Thus it can, for example, be provided that the second position sensor 20 and the unit for providing signals 22 are connected with each other by means of data technology, via the control unit 21. Therefore, the unit for providing signals 22 or the traffic light signal system shows that the first status signal 23 is dependent on which sensor outcome the second position sensor 20 provides to the control unit 21.

The position of the articulated lorry 4 in relation to the first lifting device 11 illustrated in FIG. 5 corresponds to the position of the articulated lorry 4 in relation to the first lifting device 11 illustrated in FIG. 2, with the difference that, in FIG. 5, the semitrailer 5 has still not been adjusted into the decoupling position by means of the first lifting device 11. In the state of the lifting system 1 illustrated in FIG. 5, the unit for providing signals 22 shows the second status signal 24, which characterizes that the target position and the actual position of the support assembly 12 are coinciding. Furthermore, the second status signal 24 can illustrate a stop signal, that is in particular directed at a driver of the articulated-lorry cab 6, so that it is signalled to them that the articulated-lorry cab 6 must be braked into a standstill and/or must be held, braked, at a standstill. Put another way, the second status signal 24 can signal to the driver of the articulated-lorry cab 6 to stop the articulated-lorry cab 6 from rolling or driving away by means of a service brake and/or by means of a parking brake. Alternatively or additionally, the second status signal 24 can signal to the driver of the articulated-lorry cab 6 that the target position and the actual position of the support assembly 12 are still only especially slightly spaced apart from each other, so that the driver only has an especially small amount of the distance left to travel with the articulated lorry in order to overlap the target position and the actual position of the support assembly 12. Put yet another way, the second status signal 24 means that the driver of the articulated lorry 4 is required to carry out a fine adjustment in order to allow the target position and the actual position of the support assembly 12 to coincide.

If the semitrailer 5 is unloaded from the articulated-lorry cab 6 by means of the lifting system 1, in particular by means of the first lifting device 11, in that the semitrailer 5 has been adjusted into the decoupling position by means of the first lifting device 11, and if all other measures have been taken so that the articulated-lorry cab 6 and the semitrailer 5 are independent of each other, then the unit for providing signals 22 provides the third status signal 25 (see FIG. 6). When considering FIG. 6 in combination with FIG. 3, it becomes clear that the relative position between the semitrailer 5 and the first lifting device 11 illustrated in FIG. 6 corresponds to the relative position between the semitrailer 5 and the first lifting device 11 illustrated in FIG. 3. The third status signal 25 characterizes that driving away without risk or as intended with the articulated-lorry cab 6 is enabled, without pulling or otherwise moving the semitrailer 5 in an undesired manner.

The unit for providing signals 22 can be manufactured especially easily and/or with low effort and can be operated especially efficiently or with low effort, if this—as herein—is formed as a traffic light. Therefore, in the present example, the first status signal 23 is a red or upper light signal, the second status signal 24 is a yellow or middle light signal and the third status signal 25 is a green or lower light signal.

In a further embodiment, the lifting system has a further lifting device 26, by means of which the base element 8 together with first lifting device 11 is height-adjustable between a first road surface level 27 and at least one further road surface level 28. Therefore, the second lifting device 26 is a lift or at least a device comparable with a lift. This is because the road surface levels 27, 28 are in particular on different floors 29, 30, which becomes clear when considering FIGS. 7 to 11 together.

Figure 7:
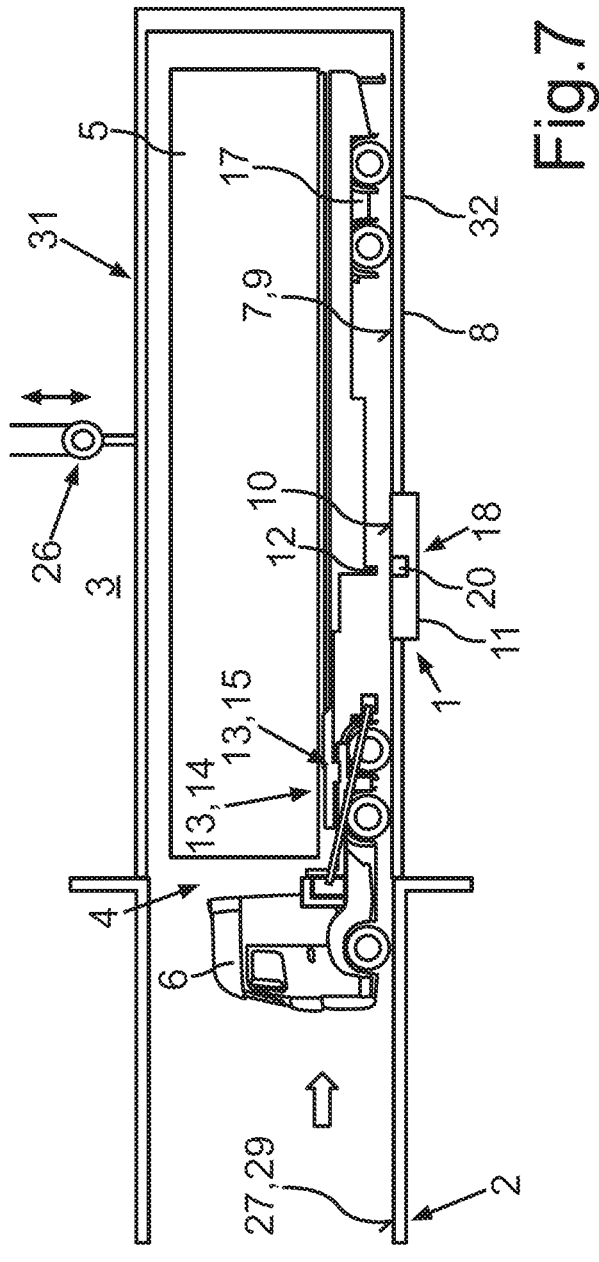
FIG. 7 is a schematic view of a part of a logistics operating facility, which comprises a lifting system with a first lifting device for adjusting the semitrailer between the decoupling position and the coupling position, as well as a second lifting device for adjusting the semitrailer between a first road surface level and a further road surface level.

FIG. 7 shows a schematic view of a part of the logistics operating facility 2, which comprises the lifting system 1, i.e., the first lifting device 11 and the second lifting device 26, as well as both road surface levels 27, 28 or both floors 29, 30. In FIG. 7 it is shown how the articulated lorry 4 is manoeuvred in relation to the first lifting device 11 on the first road surface level 27 or on the first floor 29, in particular by means of the articulated-lorry cab 6, in such a way that the target position and the actual position of the support assembly 12 coincide. If this is the case, then the semitrailer 5 is adjusted into the decoupling position, as previously described. This means that the articulated-lorry cab 6 then drives away from the semitrailer 5 as intended, so that the semitrailer 5 is initially arranged alone on the first road surface level 27 or on the first floor 29 in/on the lifting system 1. The lifting system 1 has, in this case, a transport housing 31, the base element 32 of which forms the base element 8 of the lifting system 1, so that the first lifting device 11 is integrated into the base element 32 of the transport housing 31.

Figure 8:
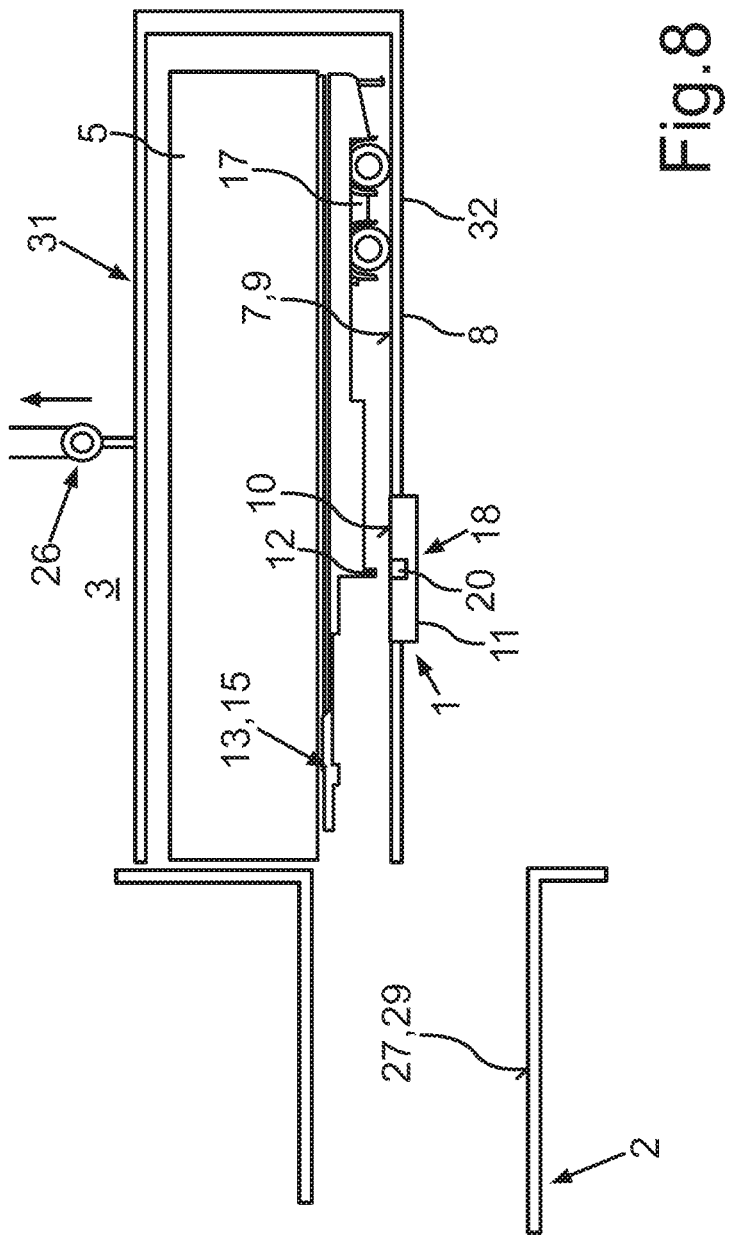
FIG. 8 is a schematic view of the logistics operating facility illustrated in FIG. 7 showing the semitrailer being adjusted between the first road surface level and the further road surface level.

If after decoupling the semitrailer 5 from the articulated-lorry cab 6, these drive away, then the transport housing 31 is height-adjustable by means of the second lifting device 26, which is illustrated in FIG. 8. FIG. 8 shows a schematic view of the logistics operating facility 2 when adjusting the semitrailer 5 between the first road surface level 27 and the further road surface level 28. It must be recognised that when elevating the transport housing 31, this, together with the semitrailer 5, is elevated in relation to the first road surface level 27 or in relation to the first floor 29.

Figures 9, 10:
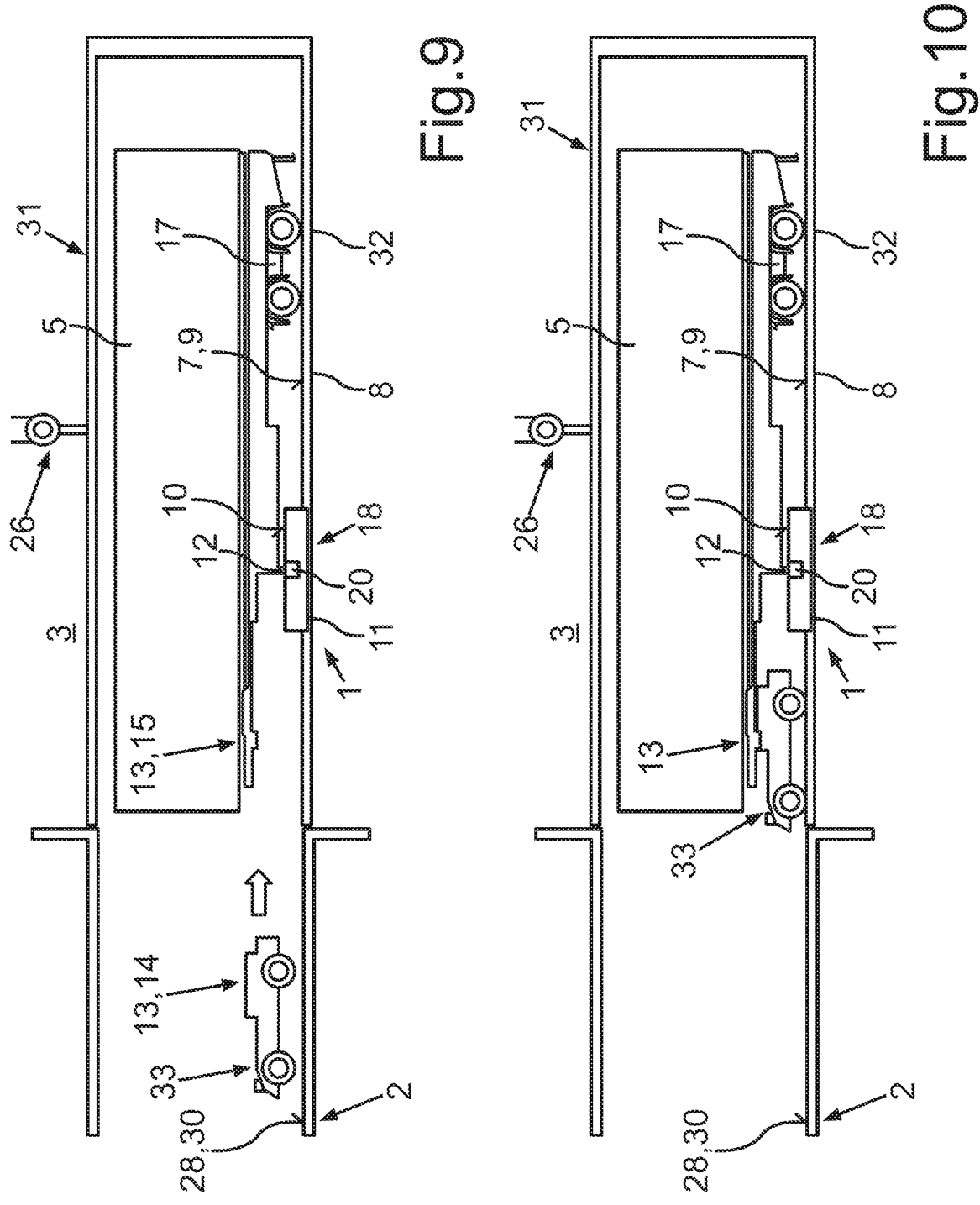
FIG. 9 is a schematic view of the further road surface level of the logistics operating facility showing the coupling of a towing vehicle onto the semitrailer.
FIG. 10 is a schematic view of the further road surface level illustrated in FIG. 9, wherein the towing vehicle and the semitrailer are coupled onto each other.

FIG. 9 shows a schematic view of the further road surface level 28 or the further floor 30, wherein the surface segment 9 of the base element 8 and the further road surface level 28 coincide. With renewed reference to FIG. 7, it must be established that the first road surface level 27 and the surface segment 9 coincide in the state shown there—i.e., if a height level of the transport housing 31 corresponds with a height level of the first road surface level 27 or of the first floor 29. Consequently, in FIG. 8 the semitrailer 5 is elevated from the height level that is illustrated in FIG. 7 so that the state illustrated in FIG. 9 eventually arises.

Figure 11:
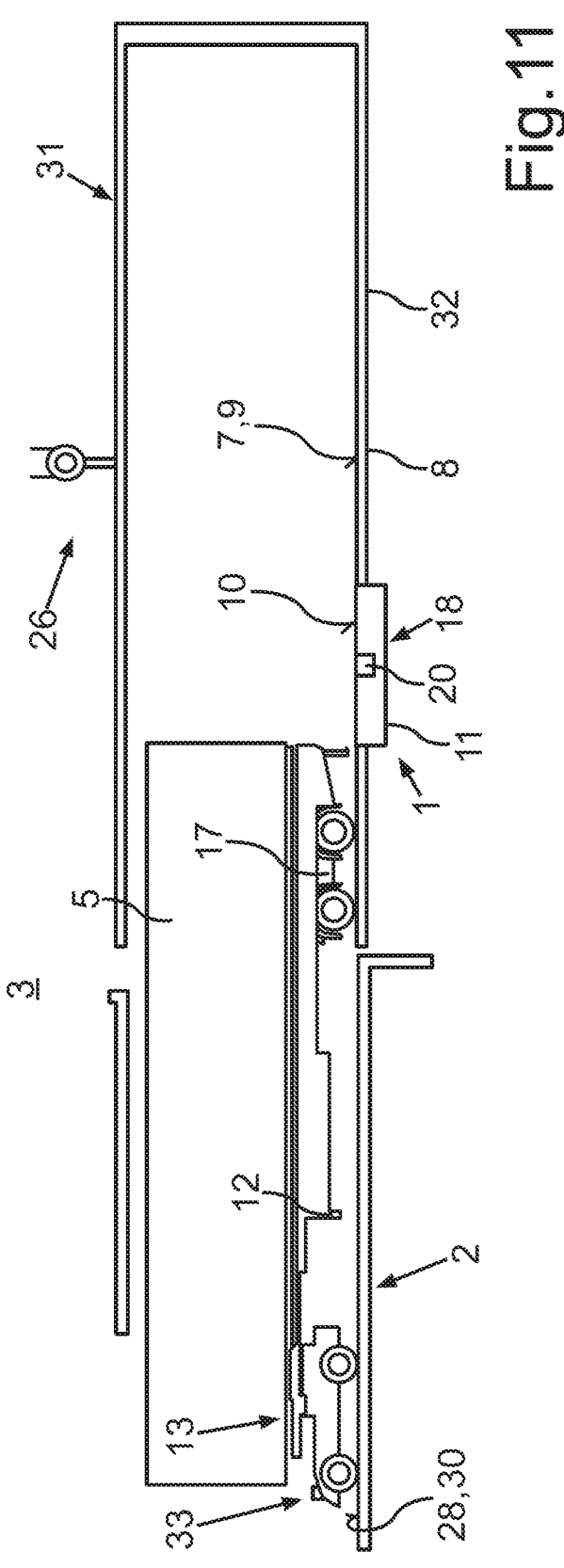
FIG. 11 is a schematic view of the further road surface level illustrated in FIG. 8 or FIG. 9, wherein the semitrailer is moved away from the lifting system by means of the towing vehicle.

In FIG. 9, FIG. 10 and FIG. 11, a towing vehicle 33 that is designed differently to the articulated-lorry cab 6 is illustrated, which is designed to perform a manoeuvre of the semitrailer 5, at least on the second road surface level 28 or on the second floor 30. Herein, the towing vehicle 33 is part of a factory traffic system of the logistics operating facility 2 or of the logistics system 3, and is in particular not designed to take part in public road traffic. In other words, the towing vehicle 33 is only associated with the logistics operating facility 2. For example, the towing vehicle 33 is formed as a driving robot, which fully autonomously assumes the movement or manoeuvring of the semitrailer 5 on a factory premises of the logistics operating facility 2. In comparison to a conventional articulated-lorry cab, in particular in comparison to the articulated-lorry cab 6, the towing vehicle 33 has comparably low external dimensions and/or a comparatively short wheelbase, so that the towing vehicle 33 can drive and/or manoeuvre especially efficiently, in particular spatially efficiently or space efficiently.

Furthermore, the towing vehicle 33 has—similarly to the articulated-lorry cab 6—a coupling element 14 on the side of the towing vehicle, that corresponds with the coupling element 15 on the side of the semitrailer, so that a fifth-wheel coupling 13 is formed or can be formed or can be closed between the towing vehicle 33 and the semitrailer 5. This is shown in FIG. 10 which shows a schematic view of the further road surface level 28 or of the further floor 30, on which the towing vehicle 33 and the schematic 5 are coupled to each other by means of the fifth-wheel coupling 13. For coupling the semitrailer 5 onto the towing vehicle 33, the towing vehicle 33 with its fifth-wheel plate drives under the semitrailer 5 that has been adjusted into the decoupling position, until the king pin receiver and the king pin positionally correspond with each other, so that the coupling element 15 on the side of the semitrailer is adjusted from the decoupling height into the coupling height by lowering the first lifting device 11, in that the semitrailer 5 is moved from the decoupling position into the coupling position by means of the first lifting device 11. Herein, the adjustment of the semitrailer 5 by means of the first lifting device 11 does not differ from the adjustment that is carried out in connection with the articulated-lorry cab 6 in order to decouple the articulated-lorry cab 6 and the semitrailer 5 from each other and/or in order to couple the articulated-lorry cab 6 and the semitrailer 5 to each other.

If the semitrailer 5 is thus on the fifth-wheel plate of the towing vehicle 33 and if the fifth-wheel coupling 13 is closed as intended, then moving, pushing and/or manoeuvring the semitrailer 5 by means of the towing vehicle 33 is enabled. Placing the semitrailer 5 on the fifth-wheel plate of the towing vehicle 33 occurs because the first lifting device 11 and, as a result, the surface segment 10 associated with the first lifting device 11 has been sunk into the base element 8 or into the base element 32 in such a way that the surface segments 9, 10 are on a common floor (again). This is then shown in FIG. 1, which shows a schematic view of the further road surface level 28 or the further floor 30, wherein the semitrailer 5 is moved away from the lifting system 1 by means of the towing vehicle 33.

Overall, the invention shows how an especially efficient and in particular automated or automatable flow of goods or freight is enabled or supported by means of the lifting system 1, by means of the logistics operating facility 2 and/or by means of the logistics system 3. This is because an undesired stationary period of both the articulated-lorry cab 6 and also the semitrailer 5 is reduced to a minimum in an advantageous manner. Therefore, the invention contributes significantly to an automation of a logistics operating facility, whereby a high flow rate of goods or freight can be increased still further. It is especially advantageous in the present invention that no changes to conventional semitrailers are necessary in order to be able to work with the lifting system 1, with the logistics operating facility 2 and/or with the logistics system 3. This hereby particularly takes account of the idea of economic and/or ecological sustainability.

The invention claimed is:

1. A lifting system (1) for a semitrailer (5) of an articulated lorry (4), comprising:
   a first lifting device (11), wherein the semitrailer (5) is adjustable by the first lifting device (11) in relation to a surface (7) of a base element (8) on which the semitrailer (5) is positioned between a coupling position, in which a coupling element (15) of the semitrailer (5) is arranged at a coupling height above the surface (7) of the base element (8), and a decoupling position, in which the coupling element (15) is arranged at a decoupling height above the surface (7) of the base element (8);
   wherein the first lifting device (11) is associated with a surface segment (10) of the base element (8) and wherein the surface segment (10) is height-adjustable by the first lifting device (11) such that the semitrailer (5) is adjustable between the coupling position and the decoupling position by an adjustment of the surface segment (10); and
   a position sensor system (18), wherein a current position of a support assembly (12) of the semitrailer (5) is detectable in relation to the first lifting device (11) by the position sensor system (18) and wherein an adjustment of the first lifting device (11) is releasable and/or lockable by the lifting system (1) based on the current position of the support assembly (12) in relation to the first lifting device (11).

2. The lifting system (1) according to claim 1, wherein the position sensor system (18) is arrangeable at least partially on an articulated-lorry cab (6) of the articulated lorry (4).

3. The lifting system (1) according to claim 1, wherein the position sensor system (18) is arrangeable at least partially on the first lifting device (11).

4. The lifting system (1) according to claim 1, further comprising a second lifting device (26), wherein the base element (8) is height-adjustable between a first road surface level (27) and a second road surface level (28) by the second lifting device (26).

5. The lifting system (1) according to claim 1, further comprising a unit for providing signals (22), wherein a status signal (23, 24, 25) that characterizes a current status of the lifting system (1) is providable to an articulated-lorry cab (6) of the articulated lorry (4) by the unit for providing signals (22).

6. A logistics operating facility (2) for a lorry fleet, comprising:
   the lifting system (1) according to claim 1.

7. The logistics operating facility according to claim 6, further comprising a first floor (29) and a second floor (30), wherein the lifting system (1) has a second lifting device (26) and wherein the base element (8) is adjustable between the first floor (29) and the second floor (30) by the second lifting device (26).

8. The logistics operating facility (2) according to claim 7, wherein a trailer vehicle (5) and a first towing vehicle (6) of the lorry fleet are decoupleable from each other by the first lifting device (11) on the first floor (29), wherein the trailer vehicle (5) is adjustable onto the second floor (30) by the second lifting device (26), wherein a second towing vehicle (33) and the trailer vehicle (5) are coupleable onto each other on the second floor (30), and wherein at least one of the first and second towing vehicles (6; 33) is only associated with the logistics operating facility (2).

9. A logistics system (3), comprising:

a lorry fleet; and a logistics operating facility (2), wherein the logistics operating facility (2) comprises the lifting system (1) according to claim 1.

<div align="center">*  *  *  *  *</div>